May 8, 1951 T. W. ELLIOTT 2,551,588

PARTY-LINE TELEPHONE SYSTEM

Filed Jan. 2, 1947 4 Sheets-Sheet 1

Inventor.
Thomas William Elliott
By Robert Harding Jr.
Attorney

May 8, 1951 T. W. ELLIOTT 2,551,588

PARTY-LINE TELEPHONE SYSTEM

Filed Jan. 2, 1947 4 Sheets-Sheet 2

Inventor
Thomas William Elliott
By Robert Harding Jr.
Attorney

PARTY-LINE TELEPHONE SYSTEM

Filed Jan. 2, 1947 4 Sheets-Sheet 3

Inventor
Thomas William Elliott
By
Robert Harding Jr.
Attorney

May 8, 1951 T. W. ELLIOTT 2,551,588

PARTY-LINE TELEPHONE SYSTEM

Filed Jan. 2, 1947 4 Sheets-Sheet 4

Inventor
Thomas William Elliott
By
Robert Harding Jr.
Attorney

Patented May 8, 1951

2,551,588

UNITED STATES PATENT OFFICE 2,551,588

PARTY LINE TELEPHONE SYSTEM

Thomas William Elliott, London, England, assignor to International Standard Electric Corporation, New York, N. Y.

Application January 2, 1947, Serial No. 741,757
In Great Britain November 23, 1945

Section 1, Public Law 690, August 8, 1946
Patent expires November 23, 1965

20 Claims. (Cl. 179—28)

This invention relates to party-line telecommunication systems.

The use of an omnibus or party line system for telephonic or telegraphic communication between a number of subscribers is old in the art, and such systems have generally consisted of a two-wire unrepeatered line with intercommunication facilities, and various degrees of refinement in the way of selective calling, lock-out features, and such like provided.

According to the present invention there is provided a party-line telecommunication system comprising a uni-directional repeatered loop.

The invention also comprises a party-line telecommunication system comprising a uni-directional repeatered loop with phantom signalling.

The invention will now be particularly described in its application to a coaxial cable communication system for use as a supervisory telephone system therewith, but it would be equally applicable to any other communication line system, or it could stand on its own purely as an intercommunication system with omnibus facilities.

On account of the high frequencies involved in carrier communication, and the severe attenuations suffered at the highest frequencies, a large number of closely spaced repeater stations is generally required, the spacing of such stations on a coaxial cable system being of the order of 6 miles. In such a case, also, the greater number of the repeater stations will consist of small unattended stations, comprising only the necessary amplifiers and power equipment, and telephone facilities are not normally provided for access to the public telephone system or to larger repeater stations along the route.

In view of the large number of such unattended stations, however, the question of maintenance, automatic notification of faults to a controlling or head station, and ready telephonic communication therewith assumes great importance, and it becomes desirable to provide special facilities at each repeater station, attended or not, for contact to be established with the said controlling station, regardless also of what other contacts may already exist, as in the case of the larger attended stations.

To facilitate such intercommunication as well as to utilise available space in the costly cables provided for coaxial systems, it is customary to fill the interstices between the separate coaxial cores in a composite cable with pairs or quads of ordinary insulated conductors which can be used for signalling and telephonic purposes.

Figure 1:
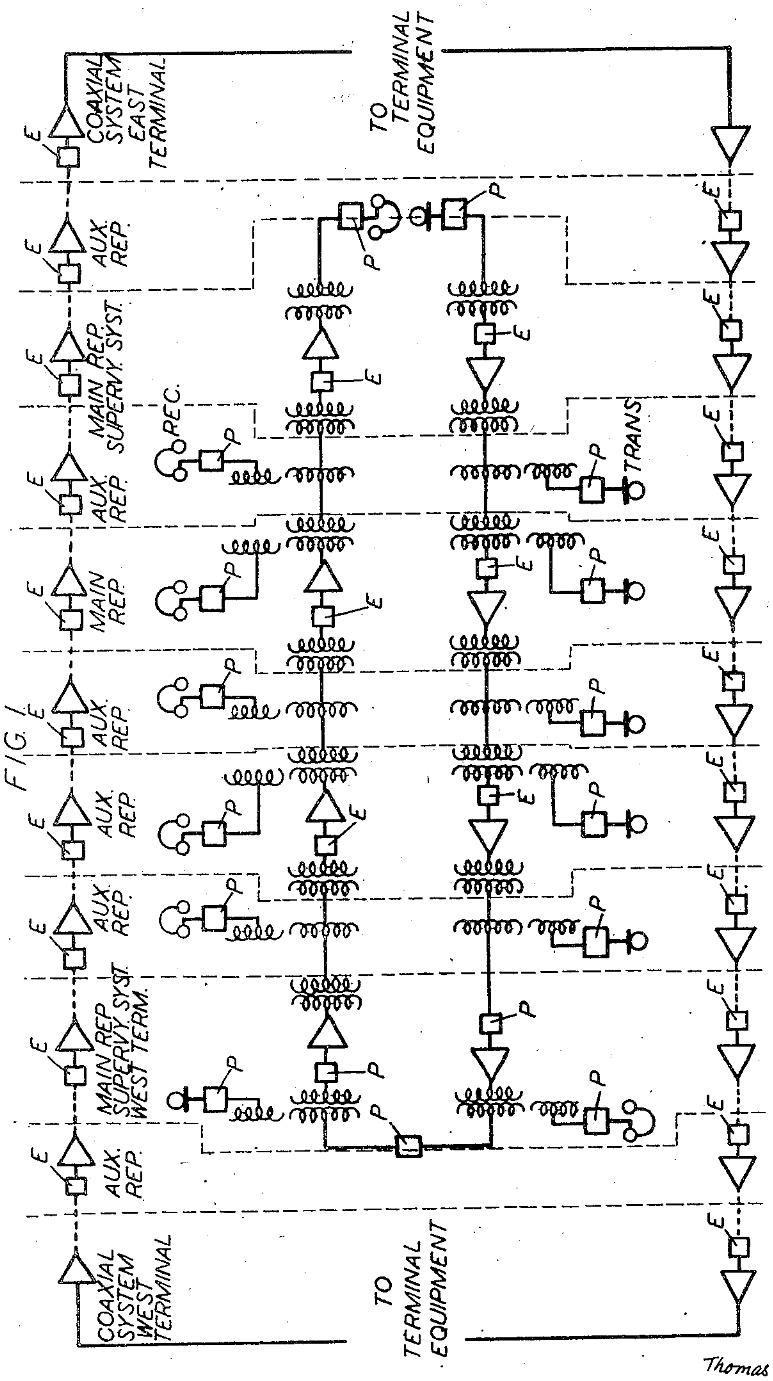

An embodiment of the invention is illustrated in the attached drawings, in which, Fig. 1 shows a complete party line applied to a section of a coaxial cable carrier communication system utilizing an interstitial quad.

Figure 2:
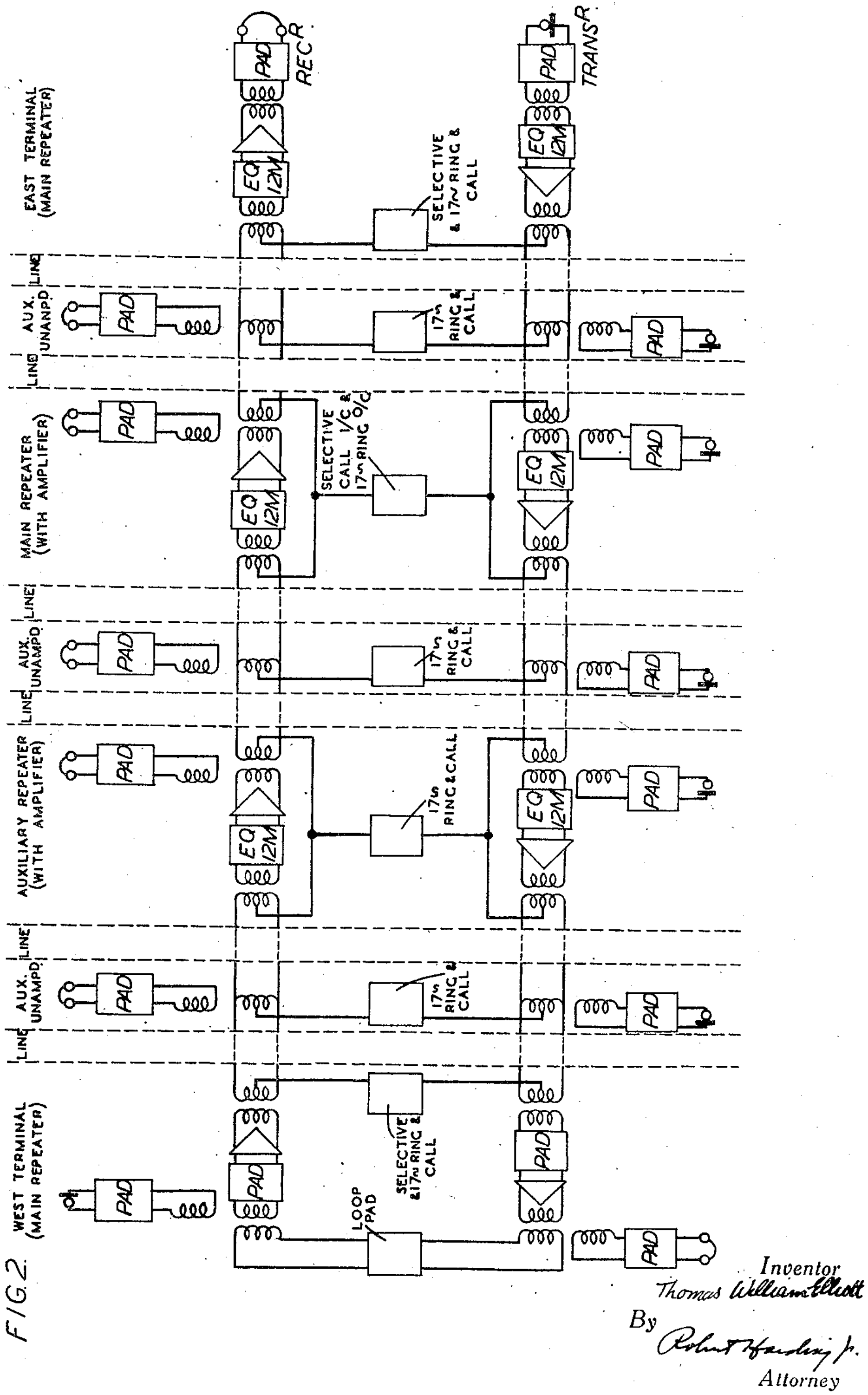

Fig. 2 shows the supervisory system of Fig. 1 extracted from the coaxial system with which it is associated.

Figure 3:
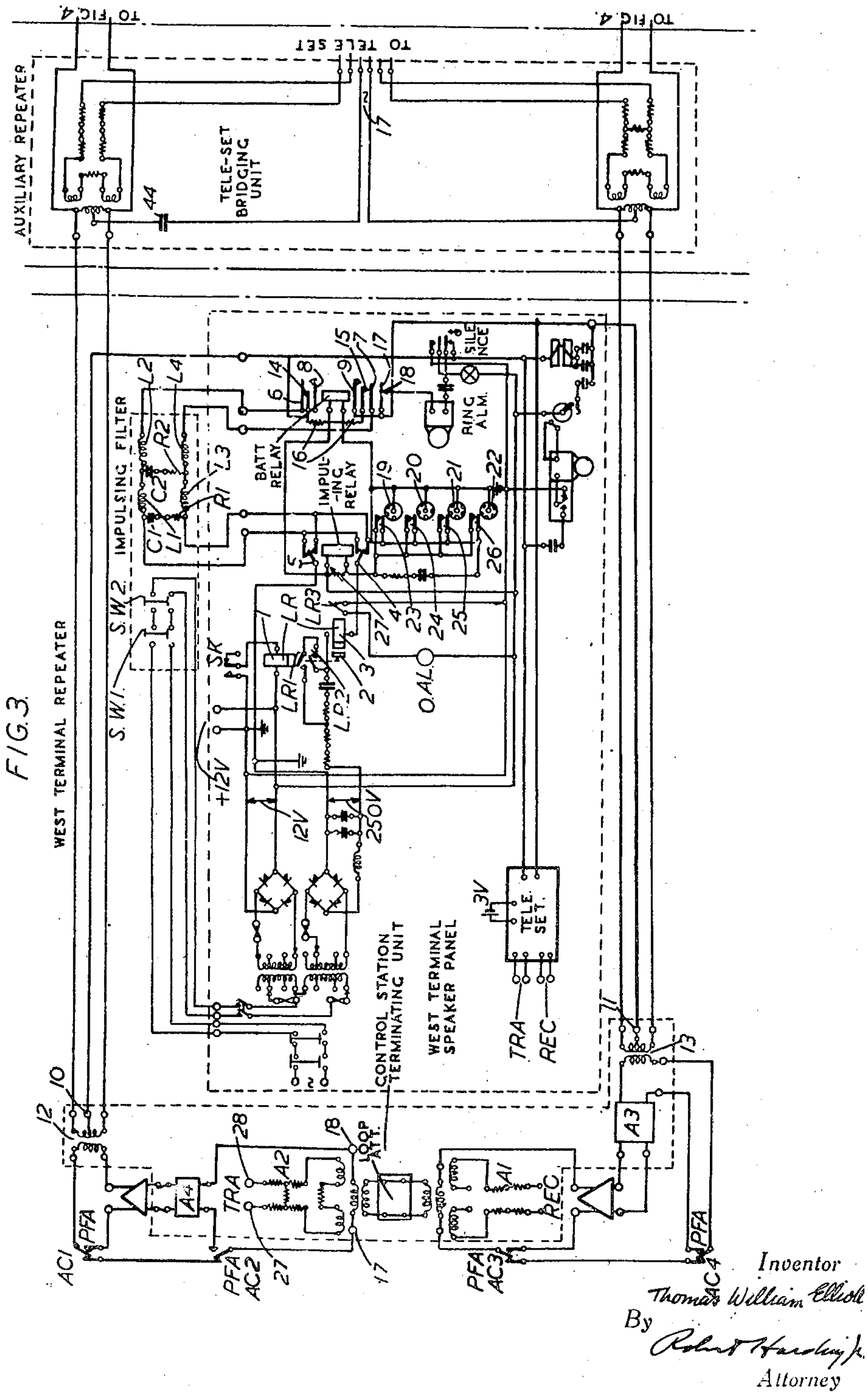
Figure 4:
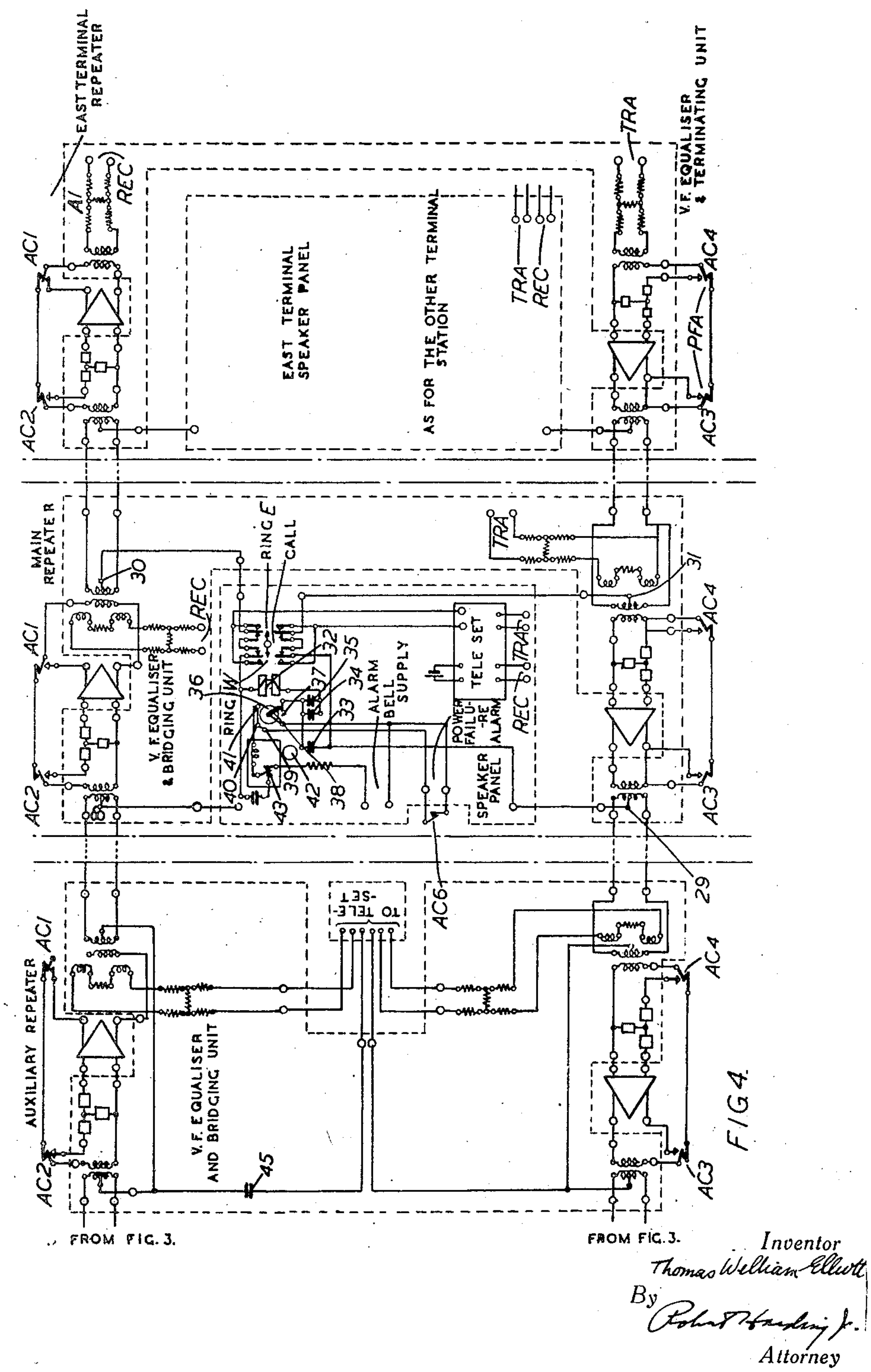

Figs. 3 and 4, with Fig. 4 placed to the right of Fig. 3, show diagrammatically, the calling and ringing arrangement of the supervisory system stripped of the unessential details.

Fig. 1 of the drawing shows in single-line, block schematic form at the top and bottom, the coaxial system consisting of terminal repeater stations, main repeater stations, and auxiliary repeater stations (the two latter types being substantially identical from the coaxial system point of view), and within this main scheme, the application of the voice-frequency party-line supervisory system to a certain section of the coaxial cable system, beginning and ending with main repeater stations, and embracing one other main repeater station and a number of auxiliary stations.

The auxiliary stations from the point of view of the V. F. system are of two types, (A) and (B), the former being equipped with bridging transformers only, to facilitate telephonic tapping of the line, while the latter contain in addition a complete V. F. repeater with line equalisers.

For a system such as the coaxial where the repeater stations are closely spaced, V. F. repeaters of convenient gain need be inserted only at alternate stations for satisfactory performance of the V. F. circuit. Fig. 1 illustrates this point, but it is not necessarily true to type in the actual arrangement of coaxial repeaters (main and auxiliary) which would obtain in practice in the laying-out of a coaxial system, the arrangement illustrated being merely convenient for explanatory purposes.

In the figure, transmitters and receivers, represented by well-known conventions, are shown connected by attenuating pads (P) and bridging transformers into the party-line, transmitters in general on the one side, before the equalisers (E), and receivers in general on the other side, after the line amplifier.

In Fig. 2 is shown the supervisory system of Fig. 1, extracted from the coaxial system with which it is associated, for greater clarity, and including also both conductors of the circuit and detail relating to the calling and ringing facilities provided.

The supervisory circuit arrangement shown is designed to meet the following conditions:

1. All supervisory equipment to be operated over interstitial conductors (as described above).
2. One V. F. terminal station to have control over the entire system.
3. Both terminals to be equipped for controlling the entire system, and switch-over of control from one terminal to the other to be effected instantly.
4. Selective calling facilities to be provided from either control terminal to the main repeaters.
5. All initial contacts between main repeaters to be made via the control terminal.
6. Auxiliary repeaters, normally unattended, to have facilities for access to the party-line circuit, including calling and ringing facilities.
7. Provision to be made for safeguarding supervisory communication to a partial extent in the event of breakdowns.
8. Conference facilities to be provided whereby any group or all of the stations may converse freely as in a conference, without serious detriment to the telephonic efficiency of the circuit as a whole.

*General description of supervisory system*

Referring to Fig. 2, it will be observed that the 4-wire system provided is not quite conventional in design, but is rather more like a unidirectional, 2-wire system with two appearances, however, at each sub-station. On the first appearance, a transmitter is connected to the line, and on the second, a receiver, and the circuit is in the form of an open-ended loop or ring, the two legs of the circuit being looped at one terminal by a suitable attenuating pad or artificial line. Note that at this terminal, the receiver and transmitter connections are reversed to avoid unpleasant side-tone effects.

A phantom circuit for signalling purposes, and operating equally to either terminal, is provided in the usual way over the two legs of the circuit treated as single conductors, and derived by means of centre-tapped transformers at each repeater station; and a through, end to end, metallic connection is preserved by means of centre-point bridging connections over the V. F. amplifiers where they are provided.

*Calling and ringing arrangements*

The calling and ringing arrangements are shown, somewhat diagrammatically, in Fig. 2, and in rather more detail in Figs. 3 and 4. These latter figures have been stripped of unessential auxiliary repeaters, and show the detail of just one of each type; the two figures placed side by side give a complete supervisory system.

Each terminal station of the supervisory system is provided with a selective calling device consisting of a train despatching system of known type operating on the phantom of the 4-wire voice-frequency telephone circuit provided over the aforementioned interstitial wires.

The selective calling device used at the terminals is shown in detail in the West Terminal Speaker Panel of Fig. 3.

Supplies of 12 v. and 250 v. D. C. are derived from 50 cycle mains in the rectifying units shown, and used to operate the calling equipment. Operation momentarily of the start key SK energises winding 1 of the latching relay LR which operates at all its contacts and holds by mechanical latching of the latching device 2. The 250 v. supply line side is connected over operated contacts LR1 and LR2 in series and via the winding 3 of LR to the armature 4 of one change-over set of contacts of the pulsing relay shown, the armature 5 of the other change-over set being connected direct to the earthy side of the 250 v. supply.

The two sets of contacts of the pulsing relay are cross-connected and then fed via the impulsing filter shown to the armatures 6 and 7 of two sets of make-before-break change-over contacts on the battery relay. The front contacts 8 and 9 of these contact sets are connected direct to the centre-points 10 and 11 of the two incoming line transformers 12 and 13. The back contacts 14 and 15 are connected via a resistive network 16 to provide a dummy or alternative load to the 250 v. pulsing supply when it is not connected to line, to avoid leaving the rectifying units open-circuited. The remaining contacts 17 and 18 on this relay break the alarm bell circuit when the relay is operated.

The 4 notched circles 19—22 represent the calling dial, the impulsing contacts on each, 23—26, being in parallel and arranged to operate the impulsing relay each time they close, by earth over the dial, impulsing contacts, impulsing relay (shunted with sensitivity adjusting resistance 27) and 12 v. battery negative. At the same time, as soon as the dials are moved off-normal, the battery relay is operated, and held operated, by earth over the dial, impulse spring, battery relay winding and 12 v. battery negative.

The impulsing relay therefore operates in sympathy with the dial impulse springs, sending out alternative positive and negative pulses of the 250 v. supply via the impulsing filter and battery relay contacts (operated) to the phantom circuit.

For the dialling code, three sets of impulses are sent out, totalling together 17 pulses, or, for an omnibus call to all stations, a single group of 17 is sent, and the function of these groups in calling the wanted station will now be described.

The receiving selector mechanism is shown both in Fig. 3, at the controlling terminal, and in Fig. 4, at the main repeater.

The pulse trains received from the phantom circuit at any selective type of station, as at 28 and 29, or 30 and 31 in Fig. 4 are received via the Call key in its normal position and passed to the selector magnet 32 via condensers 33, 34 and 35, (inserted for tuning purposes) and operate the dial 36. This dial is more properly a ratchet wheel with a code wheel attached in which there is arranged a circle of holes corresponding to the ratchet steps (in angular spacing) and totalling 17. In three of these holes (the 17th being always one such hole) holding pins are inserted and as the ratchet wheel steps round under the influence of the first set of pulses, the finger member 37 either engages with the first pin or fails to engage. If it engages, the first pulse of the code agrees with the code for the station, and the wheel is held. If it does not agree, the codes do not agree, and the wheel flies back to normal. So for the other two pulses of the code. The correct coding of pulses for the station will cause the engagement of the fingers at the end of each pulse group, and carry the code wheel round to the 17th position, where it is held. Otherwise, the wheel is released to normal after one or other of the code groups.

In the 17th position, the member 38 engages with one of the contacts 39, 40 or 41, and causes the bell 42 to be rung from the alarm bell supply shown. The bell, at its back contact 43 sends a ringing tone signal back to the calling station, which is therefore notified that the station (or, rather, a station) is being rung effectively.

The selective calling system has been very sketchily described to give an indication of the manner in which it functions, but it is part of a standard type of train dispatching equipment, a full description of which can be found elsewhere. Mention can be made of the function of the latching relay referred to earlier. This is an overload relay or automatic cut-out as well as a starting relay, and if the winding 3 is subject to overload it causes the release of the mechanical ratchet 2 so that the relay releases, breaking the 250 v. supply at LR1 and LR2 and lighting the overload alarm lamp OAL at contact LR3. The resistance-capacity network across LR1 and LR2 is a spark quench circuit, as is a similar network across the calling dial contacts 23—26.

The impulsing filter shown is designed to smooth off the rather square pulses produced by the dial in order to give them a sinusoidal appearance, the fundamental frequency being of the order of 3.5 cycles per second (dial speed 7 interruptions per second, giving alternative +*ve* and —*ve* pulses).

This arrangement enables the terminal which, for the time being, is the controlling terminal, to call selectively any one of the main repeater stations, all of such stations being equipped with the necessary train-despatching selector receiving units, but not with the selective calling device. The distant terminal, also, can be called by this means.

To enable the main repeater stations to call the controlling terminal, each is provided with a supply of 17 cycle ringing current which can be transmitted at choice to either terminal using the Ring E—Ring W key of Fig. 4, again over the phantom circuit used for the selective calling, and ringing a bell or otherwise signalling at the control terminal. This is the Ring Alm. bell shown in Fig. 3 at the terminal, and operating via the Silence key.

Thus all contacts between main repeater stations are effected via the terminal station controlling, and by no other means. The attendant at main repeater X wishing to speak to the attendant at main repeater Y must first ring control, who will then call Y selectively.

For the normally unattended auxiliary stations, contact is established between them and the control by means of 17 cycle ringing current in both directions over the phantom. Thus any auxiliary station equipped temporarily by a maintenance man with a bell and a ringer will respond to all rings on the line and may ring the terminal and all auxiliary stations on the line so equipped. Confusion on this account however, is not likely to arise, since it will be rare for an auxiliary station to have a man in attendance, and the adoption of a code ring from the controlling terminal to call the attention of any such men could be readily arranged.

This system, it is apparent, does not prevent direct working between auxiliary stations, or between an auxiliary station and a main repeater station, since the auxiliary station receives all rings on the line. It does not, however, enable an auxiliary station to call a main repeater except via the controlling terminal. All such special local inter-working arrangements must, of course, be a matter for settlement in each individual case.

The main principles of the ringing and calling facilities may be summed up briefly as follows:

(1) Selective calling of main repeaters by the control;

(2) 17 cycle ringing of the control by all main repeaters;

(3) Omnibus 17 cycle ringing between control and all auxiliaries equipped with bells and ringers.

This, and the derivation of the phantom circuit, are shown in Fig. 2 by the inscribed boxes at each repeater station and the centre-tapped transformers. It will be observed that each amplifying repeater is by-passed by a direct connection between the centre-point of each line transformer on its line side, the ringing or calling current being applied or received at this point. There is thus provided a direct metallic connection from end to end of the circuit.

Change-over from one controlling terminal to the other is effected instantaneously by verbal agreement, since the selective calling and ringing facilities are bi-directional. Each main repeater station provided with permanent selective calling equipment, however, is equipped with a selecting key to enable it to ring either terminal at will, thus preventing the alternative controlling terminal which is not for the time being controlling being worried by rings which are not intended for it. The auxiliary stations could be but are not in general, equipped with this key, on the grounds of simplicity. This key is not shown in the main repeater of Fig. 2, but may be seen in Fig. 4 (E. Ring—W. Ring). It is not, of course, essential at any station to the working of the system.

*Communication facilities between stations*

The provision of communication facilities between stations gives scope for a degree of flexibility to meet a wide variety of possible circumstances.

Under normal conditions, it is sufficient to divide up the main communication system into a number of sections of suitable length for administrative, supervisory and controlling purposes in general, and a suitable length will generally include that length of line which can be rung or called from end to end without the necessity for ringing repeaters, or the risk of faint or missed rings.

So far as the telephonic side is concerned, repeaters will in general be necessary, and can always be provided easily enough at the repeater stations, and indeed, a satisfactory talking system over a long distance is not difficult to achieve or maintain.

In the system provided herein, as has been stated, one terminal is regarded as the controlling terminal, and is provided with an attenuating loop between the two sides of the supervisory system so that the 4-wire circuit becomes virtually a 2-wire open-ended unidirectional ring circuit with a number of transmitters at intervals along one portion of it, and a number of receivers at intervals along another portion of it, and repeaters at intervals all the way. This is shown clearly in Fig. 2 in which it will be seen that a form of omnibus circuit is employed to provide communication between the various stations on the system. This circuit in the case of the coaxial system being described consists of a 4-wire arrangement operating over one of the 20 db. quads, and is repeatered at alternate stations throughout the route. Each of the repeaters employed for this purpose has an insertion gain of approximately 26 db. and is equipped with a suitable line equaliser, the function of which will be discussed later.

Reading from east to west, it will be seen that the transmitter at each intermediate station is fed into the lower, or send, path of the circuit, and that the receiver at each station is fed from the equivalent point in the upper, or receive, path, so that the transmission of speech from any one intermediate station to another is always made via the west terminal, which it will be observed is looped to the receive (or return) path. At the west terminal only, the receiver is at the termination of the transmitting path, while the transmitter is at the commencement of the receive path.

Traffic round the loop between sub-stations is thus uni-directional, and always via the west or main controlling terminal, and it will be realised that in effecting a change of control from one controlling terminal to the other, there is no necessity to transfer at the same time the looping attenuator pad—and, in fact, doing so would necessitate interchanging transmitter and receiver at every sub-station.

It should be noted, however, that the loop need be only nominally or substantially open-ended at the end that is not looped. That is to say, the attenuation between the two open ends of the loop should be high, but need not be, and in a practical case, is not likely to be infinite.

The line equaliser is of known pattern, and is provided to compensate for the variable attenuation of the line sections over the range of frequencies transmitted. In the present case, this amounts to some 10 db. over a 12 mile section for the usual voice frequency range.

Further, in the circuit under discussion, the microphone at any station is fed into the input side of the V. F. amplifier (before the equaliser) and speech is received from the output side of the amplifier on the receive side. As the transmitter and receiver work nominally at constant level for all frequencies, they should work respectively into or from equalised or level points on the circuit. Hence, the equalisers on the transmit side of the circuit are pre-equalisers, equalising in advance the section ahead, while those on the receive side are exercising their more normal function of equalising for the section of line they are terminating.

For the system and gains employed, the insertion loss suffered by transmitter or receiver in a connection to the line is about 13 db., and for this loss, a bridging (line) loss of about 0.6 db. is suffered for every such connection. Additional padding in the connection may also be required, as indicated in Fig. 2.

With this arrangement a transmission equivalent round the loop between any transmitter and any receiver of about 20 db. is obtained, i. e. the power at the receiver terminals is 20 db. lower than that at the transmitter terminals.

The circuit is arranged so that the bridging loss introduced at the various sub-stations is substantially constant under all conditions, and is allowed for in the initial line-up.

This is achieved by the use of a bridging transformer at each sub-station bridging point, followed by an attenuating pad permanently connected thereto, the effect of plugging in a sub-set at one of the normally unattended stations thus having negligible additional effect through the pad. With all stations manned, as during a system line-up, the effect on the transmission equivalent of a few of the unrepeatered stations having low pad values in series with the sub-sets is unnoticeable.

One further point is of interest here. The special arrangement of 4-wire working employed permits the use of a 4-wire sub-set without the necessity of a 4-wire terminating unit to convert to 2-wire working, and the consequent 3 db. insertion loss inherent in such an arrangement to both receiver and transmitter. This enables more padding to be used in the bridging connection, thus reducing the effect of adding or removing sub-sets on the transmission equivalent.

Further in regard to bridging loss, the effect on the selective calling facilities of the addition of numerous 17 cycle bells to the phantom circuit as during a line-up can be mitigated considerably by the provision of a suitable condenser in the lead from the centre-point of the phantom circuit to the sub-set bell at an auxiliary repeater which is equipped with 17 cycle/sec. ring and call facilities only so that the impedance of the bell to the 3.5 cycle/sec. selective calling current is relatively high, whilst being not unreasonable for the 17 cycle/sec. bells. Such a condenser is shown in the auxiliary repeater stations of Figs. 3 and 4 at references 44 and 45 respectively.

Lastly, in this connection, although the arrangement shown envisages the use of both repeaters at the two stations involved in a connection, since the transmitter speaks into the circuit before the transmitting repeater, and the receiver listens on the line after the receiving repeater, this arrangement is by no means essential.

The more normal procedure in transmission is to regard the repeater as part of the line, inserted to make up for the loss of the preceding section of line, so that while it is usual to listen at the output of the receiving repeater (as in this case) it is not usual to speak into a repeater, but into the section of line as it leaves the station, providing the necessary transmitting gain in the station transmitting equipment.

However, in the interests of simplicity in this case, the additional gain obtained by the use of the line amplifier in the transmitting path is utilised to provide lower insertion shunting losses (as described) and more padding generally, apart from the simplification obtained in the transmitting apparatus in the sub-set.

From many points of view, however, the more orthodox method of connection is to be preferred, "diagonalising" the connections of transmitter and receiver at a station, since in such a case, the transmission equivalent round the loop between two points is the same whether going clockwise or anticlockwise (assuming equal looping pads at the two ends), and such an arrangement is regarded as being within the scope of this invention.

*Emergency conditions*

In a supervisory system of this nature, it is of great importance to maintain communication between one of the controlling terminals and the sub-stations during a wide variety of emergency conditions when the main communication system may be broken down, or when the supervisory system itself may be interrupted.

Such conditions include power failure at a repeater station, and a failure in some part of a V. F. amplifier.

With regard to the first point, for the coaxial system, the system repeaters generally receive their power supplies in the form of 50 cycle A. C. transmitted over the cable itself, and this supply would normally be used also for the V. F. repeaters. Thus, the failure of the power supply at or to a repeater station would cause the loss not only of the main system but of the supervisory system as well.

Provision is therefore made, in the form of a power failure relay which releases, to bridge automatically each V. F. repeater at the station and thus maintain the supervisory speaking circuit, at, of course, a greatly reduced transmission equivalent. However, each equaliser at the station is bridged out as well so that the loss of equivalent is mitigated to some extent, at the expense of some amount of equalisation. Speech over such a circuit is readily maintained and the distortion introduced (or rather, not removed) is scarcely noticeable.

For these reasons, it is convenient to regard the equaliser and amplifier as a single unit, and to switch or bridge both together. This is achieved, as shown in Figures 3 and 4, by the contacts AC1 and AC2 which switch in or out the upper repeater unit, and by AC3 and AC4 which switch in or out the lower repeater unit, and to simplify the switching, the repeater units are built as unbalanced structures so that only the non-earthy sides need be switched.

This becomes particularly convenient when the equaliser is absorbed into the amplifier as a part of its gain-determining mechanism so as to produce a repeater with a "skew" gain v. frequency characteristic, and such a repeater would be considered as within the scope of this invention.

The contact AC6 shown in the main repeater of Fig. 4 serves to give warning of power failure thereby ringing the call bell at the station. This warning is also relayed to the controlling terminal (by means not shown).

For other emergency conditions, such as cable failure, V. F. amplifier failure and the like, automatic means of dealing with the contingency are not provided.

For the attended stations, patching arrangements are generally available for dispensing with a faulty amplifier while servicing is carried out on it, while for cable breakdown, involving more serious interruption of working, local arrangements may be made for interworking, or the supervisory system suspended until a repair can be effected.

In such a case arrangements can generally be made on site, at the station before the failure to provide a loop between the two halves of the circuit thereby enabling communication to be carried on between each controlling terminal and the group of stations associated with it up to the cable fault, the maintenance of communication facilities in such circumstances being particularly desirable.

The supervisory system of the invention has been particularly described in connection with a preferred embodiment based on a coaxial cable communication system, but it is clearly applicable to any cable, land-line or submarine cable system where there is a 4-wire metallic circuit available, and facilities for providing repeaters where necessary.

So far in this country, the coaxial links provided have been sufficiently short self-contained units to constitute "sections of suitable length" as herein defined, so that the system terminals become naturally the terminals of the supervisory system also. But this arrangement is by no means essential or inevitable, and a nation-wide or continental coaxial system might well need to be divided at convenient main repeater points into administrative units of suitable length, and supervisory systems applied to the separate sections according to the principles herein described in the specific embodiment.

What is claimed is:

1. A party-line telecommunication system comprising a uni-directional, two-line repeatered loop circuit including means arranged for phantom circuit signalling, means connecting first ends of said loop circuit together through an attenuator pad having a relatively moderate attenuation characteristic, means connecting the other ends of said loop circuit together through an attenuator pad of relatively high attenuation, a selective signalling system connected for operation over said phantom circuit means, a controlling station connected to said loop circuit, a plurality of sub-stations connected to said loop, means for selectively signalling said sub-stations over said phantom circuit means and means at said sub-stations for signalling the said controlling station over said phantom circuit means.

2. A party-line telecommunication system as claimed in claim 1, in which each station is connected to the two sides of said unidirectional loop, and means including the said phantom circuit for signalling from a sub-station to the said controlling station.

3. A party-line telecommunication system as claimed in claim 2 comprising means including center connected transformers in both legs of the said unidirectional circuit for deriving a two way signalling phantom circuit over the said unidirectional repeatered loop and for maintaining a metallic connection from end to end of the said party-line system.

4. A party-line telecommunication system as claimed in claim 1 comprising two controlling stations and means for selective signalling at will from either of the said controlling stations over the said phantom circuit to the sub-stations and to the other controlling station.

5. A party-line telecommunication system as claimed in claim 4 in which the said means for selective signalling comprises a code operated train despatching system and the said means for signalling to a controlling station comprises a source of ringing current at a sub-station and a ringing current responsive signalling device at the controlling station.

6. A party-line telecommunication system as claimed in claim 5 comprising means at each of said stations for connecting with small shunting line-loss a transmitter and a receiver respectively to the two sides of the said unidirectional loop.

7. A party-line telecommunication system as claimed in claim 6 in which the transmitters at stations equipped therewith are connected into one said side of the said unidirectional loop, and the receivers at stations equipped therewith are connected into the other said side of the said unidirectional loop.

8. A party-line telecommunication system as claimed in claim 7 in which the transmitter and receiver at the station containing the aforesaid attenuating pad of relatively moderate attenuation are connected to the said legs of the unidirectional loop in the reverse manner from that of the other stations, the receiver being connected to the side to which all other transmitters are connected, and the transmitter being connected to the side to which all other receivers are connected.

9. A party-line telecommunication system as claimed in claim 8 comprising amplifying means in at least one of the said controlling or substations through which the unidirectional repeatered loop passes.

10. A party-line telecommunication system as claimed in claim 9 comprising line equalisers for providing compensation for variable attenuation with frequency of the line over the range of frequencies transmitted.

11. A party-line telecommunication system as claimed in claim 10 in which the said line equaliser is associated with the aforesaid amplifying means to provide a voice frequency gain characteristic in the said amplifying means which shall substantially compensate for the voice frequency loss characteristic of the section of line preceding the said amplifying means.

12. A party-line telecommunication system as claimed in claim 11 in which the transmitter and receiver of a telephone sub-set are connected to the said unidirectional repeatered loop at a sub-station provided with amplifying and equalising means at points for each following the said amplifying and equalising means.

13. A party-line telecommunication system as claimed in claim 12 in which the transmitter and receiver of a telephone sub-set are connected to the said unidirectional repeatered loop at a substation provided with amplifying and equalising means at a point for the transmitter preceding the said means for the transmission side, and at a point for the receiver following the said means for the receiving side.

14. A party-line telecommunication system as claimed in claim 13 for use as a supervisory telephone system on a multi-channel communication line system between selected repeater stations thereon in which the said sub-stations and controlling stations are located in some or all of the selected repeater stations.

15. A party-line telecommunication system as claimed in claim 14 in which the aforesaid amplifying means is provided with operating power from a source derived from power transmitted over and received from the said multi-channel communication line system.

16. A party-line telecommunication system as claimed in claim 15 in which relay means are provided for bridging out of circuit the said amplifying means in a station in which the power supply to the said amplifying means has failed, thereby enabling communication over the said party-line telecommunication system to be maintained at a reduced transmission equivalent.

17. A party-line telecommunication system as claimed in claim 16 in which the equalisers associated with the said amplifying means are bridged out of circuit along with the said amplifying means in the manner described.

18. A party-line telecommunication system as claimed in claim 17 in which the said stations controlling the traffic on the said party-line system are located at the ends of the group of repeater stations selected and served by the said party-line system.

19. A party-line telecommunication system as claimed in claim 18 in which the said multichannel communication system comprises a coaxial cable carrier communication system, the said party-line supervisory system being applied to conductors inserted interstitially with the said coaxial cable in a composite cable.

20. A party-line telecommunication system for use as a supervisory telephone system between repeaters on a coaxial cable carrier communication system comprising a 4-wire circuit constituted by two pairs coextensive with at least a portion of the said coaxial system, repeaters comprising amplifiers and line equalisers in each of the said pairs, and oppositely directed respectively in the two pairs, an attenuating pad at one end of the said 4-wire circuit joining the adjacent ends of the two pairs thereat thereby deriving a 2-wire unidirectional repeatered loop from the said 4-wire circuit, controlling stations at the two ends of the said unidirectional loop, sub-stations located along the said unidirectional loop with access to each pair of the said unidirectional loop for the separate connection of telephonic transmitting and receiving equipment thereto, means including center connected transformers at each station for the connection with low shunt loss of said transmitting and receiving equipment, for the derivation of a two way phantom signalling circuit, and for the maintenance of a metallic circuit from end to end of the said party-line system, means including a code-operated train-despatching system for signalling selectively to the said sub-stations and to the other controlling station, means including a bell and a source of ringing current at each station for omnibus signalling between the controlling stations and the sub-stations, and relay means at a sub-station for bridging out of circuit the repeater thereat consequent upon a failure in the supply of power thereto.

THOMAS WILLIAM ELLIOTT.

REFERENCES CITED

The following references are of record in the file of this patent:

UNITED STATES PATENTS

| Number | Name | Date |
|---|---|---|
| 1,571,966 | Ray | Feb. 9, 1926 |
| 2,064,319 | Pruden | Dec. 15, 1936 |
| 2,157,848 | Crocker | May 9, 1939 |
| 2,189,994 | Reir | Feb. 13, 1940 |
| 2,202,474 | Vroom | May 28, 1940 |
| 2,406,165 | Schroeder | Aug. 20, 1946 |